(12) United States Patent
Pfeiffer et al.

(10) Patent No.: US 10,638,027 B2
(45) Date of Patent: Apr. 28, 2020

(54) LOW-IMPEDANCE COAXIAL CONNECTION DEVICE WITH HOUSING FOR A CAMERA MODULE

(71) Applicant: Conti Temic microelectronic GmbH, Nürnberg (DE)

(72) Inventors: Franz Pfeiffer, Ulm/Einsingen (DE); David Lässle, Langenau (DE); Daniel Kohler, Kirchberg (DE); Stefan Heubusch, Illertissen (DE)

(73) Assignee: Conti Temic microelectronic GmbH, Nürnberg (DE)

( * ) Notice: Subject to any disclaimer, the term of this patent is extended or adjusted under 35 U.S.C. 154(b) by 0 days.

(21) Appl. No.: 15/915,844

(22) Filed: Mar. 8, 2018

(65) Prior Publication Data

US 2018/0198967 A1  Jul. 12, 2018

Related U.S. Application Data

(63) Continuation of application No. PCT/DE2016/200413, filed on Sep. 2, 2016.

(30) Foreign Application Priority Data

Sep. 14, 2015  (DE) .................. 10 2015 217 499

(51) Int. Cl.
*H04N 5/225* (2006.01)
*H04N 7/10* (2006.01)
(Continued)

(52) U.S. Cl.
CPC ....... *H04N 5/2257* (2013.01); *H01R 13/5205* (2013.01); *H01R 24/52* (2013.01);
(Continued)

(58) Field of Classification Search
CPC ........ G03B 17/02; H05K 9/00; H04N 5/2252; H04N 5/2257; H04N 5/22521; H04N 7/10;
(Continued)

(56) References Cited

U.S. PATENT DOCUMENTS

2008/0188123 A1* 8/2008 Hall ............... H01R 13/748
                                                  439/569
2009/0220013 A1* 9/2009 Butts ............. H01R 13/6581
                                                  375/257
(Continued)

FOREIGN PATENT DOCUMENTS

CN   102037619 A   4/2011
CN   103345032 A   10/2013
(Continued)

OTHER PUBLICATIONS

Anonymous, Leitkleber, Wikipedia, Aug. 27, 2013 (https://de.wikipedia.org/wiki/Leitkleber).
(Continued)

*Primary Examiner* — Twyler L Haskins
*Assistant Examiner* — Akshay Trehan

(57) ABSTRACT

A connection device for a coaxial cable which allows a comprehensive shielding by continuing the outer conductor through the entire housing of the connection device and onwards through the entire camera module. The outer conductor of an interface for the connection of a coaxial cable is electrically coupled with an electrically conductive housing, wherein the housing allows an electrical shielding of the inner components of a camera module.

11 Claims, 2 Drawing Sheets

(51) Int. Cl.
  *H01R 13/52* (2006.01)
  *H01R 24/52* (2011.01)
  *H01R 43/02* (2006.01)
  *B60R 16/02* (2006.01)
  *B60R 11/04* (2006.01)
  *H01R 103/00* (2006.01)

(52) U.S. Cl.
  CPC ............. *H04N 5/2252* (2013.01); *H04N 7/10* (2013.01); *B60R 11/04* (2013.01); *B60R 16/02* (2013.01); *H01R 43/02* (2013.01); *H01R 2103/00* (2013.01)

(58) Field of Classification Search
  CPC ...... B60R 11/04; B60R 16/02; H01R 13/5205; H01R 24/52; H01R 2103/00; H01R 43/02
  See application file for complete search history.

(56) References Cited

U.S. PATENT DOCUMENTS

| | | | | |
|---|---|---|---|---|
| 2010/0128455 | A1* | 5/2010 | Ophoven | H04N 5/2252 361/818 |
| 2011/0025850 | A1* | 2/2011 | Maekawa | H05K 9/002 348/148 |
| 2011/0096524 | A1* | 4/2011 | Kameyama | H01R 13/506 361/818 |
| 2012/0140107 | A1* | 6/2012 | Anderson | G03B 17/02 348/341 |
| 2013/0222596 | A1* | 8/2013 | Han | G03B 17/08 348/148 |
| 2013/0242099 | A1* | 9/2013 | Sauer | H04N 5/2257 348/148 |
| 2013/0242899 | A1 | 9/2013 | Lysejko et al. | |
| 2014/0099822 | A1* | 4/2014 | Duesterhoeft | H01R 13/6583 439/607.02 |
| 2014/0218535 | A1* | 8/2014 | Ihlenburg | H04N 7/183 348/148 |
| 2014/0373345 | A1* | 12/2014 | Steigerwald | H04N 5/2252 29/739 |
| 2015/0222795 | A1* | 8/2015 | Sauer | H04N 5/2257 348/148 |
| 2015/0280373 | A1* | 10/2015 | Furukawa | H01R 13/46 439/578 |
| 2015/0325964 | A1* | 11/2015 | Kunieda | H01R 24/38 439/578 |
| 2015/0365569 | A1* | 12/2015 | Mai | H04N 5/2252 348/373 |
| 2017/0271819 | A1* | 9/2017 | Hehir | H01R 13/6583 |
| 2018/0255213 | A1* | 9/2018 | Ahn | B60R 1/00 |

FOREIGN PATENT DOCUMENTS

| | | |
|---|---|---|
| CN | 103858282 A | 6/2014 |
| CN | 104464949 A | 3/2015 |
| DE | 102009052658 A1 | 6/2010 |
| JP | 2007022364 A | 2/2007 |
| WO | WO2014055224 A1 | 4/2014 |

OTHER PUBLICATIONS

International Search Report and Written Opinion dated Nov. 30, 2016 from corresponding International Patent Application No. PCT/DE2016/200413.

German Search Report dated Jun. 3, 2016 for corresponding German Patent Application No. 10 2015 217 499.9.

Chinese Office Action dated Dec. 19, 2019 for corresponding Chinese Patent Application No. 201680052930.9.

* cited by examiner

LOW-IMPEDANCE COAXIAL CONNECTION DEVICE WITH HOUSING FOR A CAMERA MODULE

CROSS REFERENCE TO RELATED APPLICATION

This application is a continuation of International application No. PCT/DE2016/200413, filed Sep. 2, 2016, which claims the benefit of German application No. 10 2015 217 499.9, filed Sep. 14, 2015, each of which is hereby incorporated by reference.

TECHNICAL FIELD

The technical field relates generally to a connection device for a camera module, a camera module, and a method for contacting a camera module, and more particularly to a connection device for connecting a camera module to a coaxial cable.

BACKGROUND

Camera modules for acquiring image data are being used in more and more areas of application. By way of example, numerous camera modules are also used in modern motor vehicles, in order to precisely detect the vehicle surroundings and, if necessary, also the interior space of the vehicle. Thanks to increasing improvements in the camera modules used for this process, it is possible to continue increasing the image quality, and, if necessary, integrate additional functions into the camera modules. In addition, increasing miniaturization of the camera modules used is also taking place in parallel to this.

This miniaturization, as well as the rising data rates due to the high image quality, and, if necessary, in addition to transferred functions, are rendering it necessary to use new transfer interfaces. In addition to the previously used solutions which were based on twisted individual conductors (such as, for example, LVDS twisted pair or LVDS twisted quad), solutions based on coaxial cables are increasingly being used in new camera modules. In particular, coaxial interfaces are also being used in this case, which, in addition to signal transmission, simultaneously allow power to be supplied to the camera module.

However, such coaxial cables represent a challenge in the connection region of the camera module. It should be possible to produce the connection as simply as possible while, on the other hand, also ensuring that it is sturdy and resistant to electromagnetic interference.

As such, it is desirable to present a connection of a camera module to a coaxial cable, which allows a reliable contacting of the coaxial cable with the camera module. In particular, there is a need for a connection of a camera module to a coaxial cable, which allows a high shielding with respect to electromagnetic interference. In addition, there is also a need for a connection of a camera module to a coaxial cable, which allows a simple and reliable contacting on installation of a camera module. In addition, other desirable features and characteristics will become apparent from the subsequent summary and detailed description, and the appended claims, taken in conjunction with the accompanying drawings and this background.

BRIEF SUMMARY

According to one exemplary embodiment, a connection device for connecting a coaxial cable to a camera module includes an electrically conductive connector housing, a connection element, and a contact plate. The electrically conductive connector housing has an opening. The connection element of the connection device is arranged above the opening of the connector housing. Furthermore, the connection element is designed to connect an inner conductor of the coaxial cable to a first electrical connection of the connection element. An outer conductor of the coaxial cable can additionally be electrically connected to a second connection of the connection element. The contact plate comprises a first connection region and a second connection region. The first connection region of the contact plate is electrically connected to the first connection of the connection element. The second connection region of the contact plate can be electrically connected to the second connection of the connection element. The connector housing of the connection device is, in this case, configured in such a manner that the contact plate is enclosed by the connector housing both at one side which faces the opening of the connector housing, and at side regions of the contact plate. In this way, only one side of the contact plate, which does not point in the direction of the opening of the connector housing, is not enclosed by the connector housing—at least while the connection device is not connected to a camera module. In addition, the connector housing is also electrically connected to the second connection of the connection element. Consequently, the connector housing is also electrically connected to the outer conductor of the coaxial cable. The connector housing consequently continues the shielding of the coaxial cable by the outer conductor across the contact plate.

According to another exemplary embodiment, a camera module includes an image acquisition device, an electrically conductive camera housing, and a connection device. The image acquisition device includes an optical module and a printed circuit board. The optical module of the image acquisition device is, in this case, arranged on a front side of the printed circuit board. The image acquisition device is additionally arranged in the electrically conductive camera housing. The first connection region and the second connection region of the contact plate are each electrically coupled with a corresponding electrical connection on the printed circuit board of the image acquisition device.

According to another exemplary embodiment, a method for contacting a camera module includes providing a connection device, contacting the connection regions of the contact plate with corresponding contacts of the camera module, and electrically and mechanically connecting the connector housing of the connection device to a housing of the camera module.

One concept presented herein is to continue the shielding of the coaxial cable provided by the outer conductor of a coaxial cable through the connection device of a camera housing and onwards across the entire camera housing. Consequently, the complete camera housing acts as a Faraday cage which shields the components in the interior of the camera housing from electromagnetic influences from externally. In this case, the coupling between the coaxial cable and the camera module is produced by a connection device, wherein the outer conductor of the coaxial cable can be comprehensively contacted with the camera module and, in particular, with the housing of the camera module. In this way, a contacting of the outer conductor of the coaxial cable with the camera module is achieved, which contacting has a very low impedance. As a result, both the interference radiation of the camera module and the interference immunity are improved. In this way, not only is a very good contacting of the outer conductor of the coaxial cable with the camera module achieved, but no gap, which could make the camera module prone to electromagnetic interference, is created either in the connection region of the camera module.

In this way, a connection for a camera module is made possible, which, on the one hand, shields the camera module very well from electromagnetic interfering effects from externally and, in addition, also allows a connection of the coaxial cable to the camera module on the installation of a camera module, which connection can be produced very easily.

According to one exemplary embodiment, the connector housing and the second connection of the connection device are connected to one another an electrically conductive adhesive. In particular, the electrical connection can be produced by a complete annular adhesive structure around the opening of the connector housing. In this way, a comprehensive contacting between the connection device and connector housing can be produced.

According to one exemplary embodiment, the second connection of the connection element is mechanically pressed into the connector housing. By mechanically pressing the second connection into the connector housing, a mechanically stable connection and a good electrically conductive, i.e., low-resistance, connection between the second connection and the connector housing can be produced at the same time.

According to one exemplary embodiment, the connector housing and the second connection are comprehensively electrically connected to one another at low-resistance and with a low impedance. A type of Faraday cage can be formed by electrical connection which has as low an impedance as possible between the connector housing and the second connection. In this way, a very good electrical shielding is achieved.

According to another exemplary embodiment, the connection device comprises a contact sleeve. The contact sleeve is designed to electrically connect the second connection of the connection element to the second connection region of the contact plate. The connection device can additionally also comprise a further contact sleeve or an electrically conductive element which electrically connects the first connection of the connection element to the first connection region of the contact plate. In this way, the contacting between the connection element and the contact plate can be produced in a coaxial design so that a good shielding exists and, in addition, the impedance of the coaxial cable is also maintained.

According to another exemplary embodiment, the connection element includes an SMBA connector or respectively a FAKRA (Fachkreis Automobil) ["Automobile Expert Group"] connector. Such plug connections for coaxial cabling are widespread, in particular in the automobile sector, so that a camera module can, in this way, be easily integrated into a motor vehicle by means of already existing plug connections.

According to one exemplary embodiment, the connection element includes a housing part which is adapted to the connection regions of the contact plate. In this way, a particularly simple contacting between the connection element and the contact plate is possible.

According to another exemplary embodiment, the connection device includes a sealing element. The sealing element can, in this case, be arranged on the connector housing on a side facing the coaxial cable. The sealing element can, by way of example, be a sealing compound. In particular, elastic sealing compounds and/or two-component sealing compounds such as, for example, epoxy resin-based sealing compounds are, for example, possible. In this way, it is possible to seal the connection device very well from external influences such as, for example, dirt, dust, moisture, etc.

According to another exemplary embodiment, the connector housing of the connection device includes a metal material. Alternatively, the connector housing can also include a plastic which is provided with an electrically conductive coating.

According to another exemplary embodiment of the camera module, the camera housing and the connector housing of the connection device are electrically connected to one another. In this way, the electrical shielding of the connection device can be continued across the entire camera module.

According to another exemplary embodiment, the camera housing and the connector housing of the connection device are welded to one another. A very good connection between the camera housing and the connector housing can be produced, both electrically and mechanically, by welding.

According to another exemplary embodiment, the camera module includes a spring element. The spring element electrically couples the printed circuit board of the image acquisition device with the contact plate of the connection device. A very good electrical contacting can be continually achieved by a spring element between the contact plate of the connection device and the printed circuit board of the image acquisition device, even in the event of thermal loads, vibrations or similar.

According to another exemplary embodiment of the method for contacting the camera module, the electrical and mechanical connecting of the connector housing of the connection device to the camera housing of the camera module comprises welding. In particular, the electrical and mechanical connecting may utilize laser welding or also a different welding process.

BRIEF DESCRIPTION OF THE DRAWINGS

Further embodiments and advantages of the present invention are set out by the following description with reference to the attached drawings, wherein.

DETAILED DESCRIPTION

Figure 1:
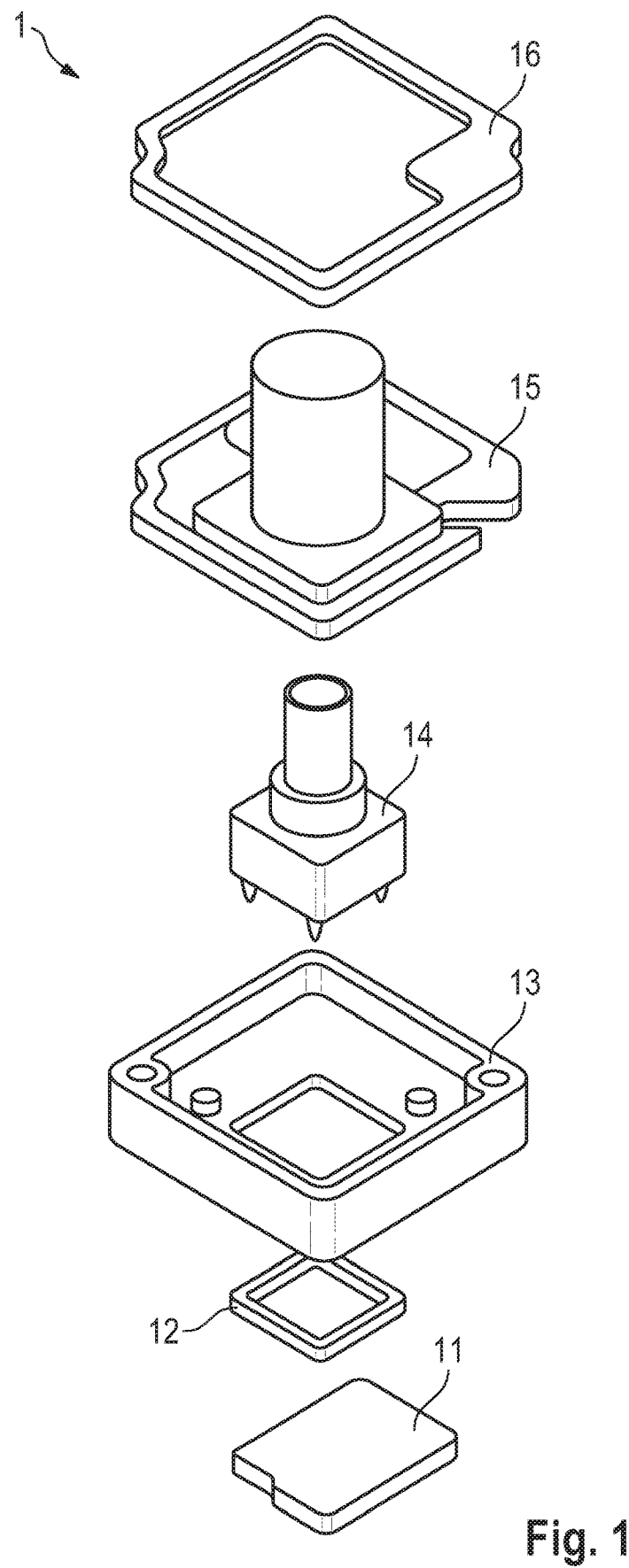
FIG. 1 shows a schematic representation of a construction of a connection device according to one exemplary embodiment.

FIG. 1 shows a schematic representation of a construction of a connection device 1 for connecting a coaxial cable to a camera module according to one exemplary embodiment. The connection device 1 for the camera module includes, in this case, an electrically conductive connector housing 13. This electrically conductive connector housing 13 can, for example, be manufactured from an electrically conductive metal such as, for example, copper, iron, aluminum, or similar. If this is a metal which has a tendency to oxidize relatively easily such as, for example, aluminum, the metal must, in this case, be prepared if necessary, in order to be able to reliably produce the electrical contacting described in more detail below. Alternatively, it is also possible to manufacture the connector housing 13 from an electrically non-conductive material such as, for example, a plastic or similar. By way of example, such a housing can be shaped by extruding a plastic. In this case, in order to produce the electrically conductive properties of the housing, the electrically non-conductive material can be provided with an electrically conductive coating. By way of example, the electrically conductive coating can be produced by vapor deposition, spraying, sputtering, or similar. The connector housing 13 has, in this case, an opening 13*a*. As a result of this opening 13*a* it is possible to pass electrical connections from the outside (at the top in FIG. 1) through into the interior (at the bottom in FIG. 1) of the connection device 1.

A connection element is arranged in the opening 13*a* of the connector housing 13. By way of example, this connection element can be a standardized connector interface. Therefore, for example, connector interfaces based on a FAKRA connector (Fachkreis Automobil connector), further SMBA adapters or any other connector interfaces, in particular connector interfaces for coaxial plug connections, are possible. The connection element includes, in this case, a housing part 15 made of an electrically insulating material, as well as electrically conductive connections. The housing part 15 can, in this case, be manufactured from a plastic, for example. In particular, housing parts 15 which are manufactured using an injection molding method are, for example, possible.

For example, an electrically conductive pin or an electrically conductive contact sleeve may be arranged in the housing part 15 for a first electrical connection, via which the inner conductor of a coaxial cable can be connected. A further contact sleeve 14 may be additionally arranged around this electrically conductive pin or the contact sleeve, which further contact sleeve forms a second electrical connection and via which the outer conductor of the coaxial cable may be connected. The further contact sleeve 14 can, in this case, be arranged concentrically around the pin or respectively the contact sleeve in order to connect the inner conductor.

In this way, the further contact sleeve 14 can be comprehensively connected, i.e. over the entire circumference of 360°, to the outer conductor of the coaxial cable. As a result, the shielding provided by the outer conductor of the coaxial cable is continued over the entire circumference through the second connection of the connection element.

The further geometry of the connection element and, in particular, of the housing part 15 can, in addition, also be adapted to the geometry of the outer side (pointing upwards in FIG. 1) of the connector housing 13. In addition, a suitable sealing element 16 can be arranged above the arrangement of the connector housing 13 and connection element. This sealing element 16 may be configured to seal the connector housing 13 and, in particular, the opening 13*a* of the connector housing 13 from environmental influences such as, for example, dirt, dust, moisture, etc. To that end, a suitable seal in the form of an elastic sealing element is, for example, possible. By way of example, the sealing element 16 can be introduced as an elastic compound which fills the intermediate spaces between the connection element and the housing 13 and consequently seals these. Such an elastic compound can subsequently at least partially harden. This can consequently prevent the elastic compound flowing away later. In addition, any other materials are also possible for sealing. By way of example, the sealing element 16 can also comprise any other sealing compound, in particular also a sealing compound made up of two or more components, which harden completely or partially following blending and application. Depending on the area of application, UV-resistant sealing elements or similar are, in particular, also possible in this case. In this way, a correspondingly required tightness or respectively IP class up to IP6k9k can be achieved.

The connection device 1 has a contact plate 11 on the inner side of the connector housing 13, which inner side is opposite the outer side, to which the coaxial cable is connected. By way of example, this contact plate 11 can be a printed circuit board as is used, for example, for printed circuits. A conductor path structure which includes a first connection region and a second connection region can be mounted on this contact plate. A first connection region of the contact plate 11 can, in this case, be electrically connected, for example to the inner conductor of the coaxial cable. For this purpose, the first connection region of the contact plate can be connected to the pin or respectively the inner contact sleeve, which forms the first connection of the connection element. Similarly, the second connection region of the contact plate 11 can be electrically connected to the outer conductor of the coaxial cable. For this purpose, the second connection region of the contact plate 11 can be electrically connected to the further contact sleeve 14 which forms the first connection of the connection element. In this way, the electrical connections of the inner conductor and of the outer conductor of the coaxial cable can be provided on the contact plate 11. Where required, the contact plate 11 can, for this purpose, also have suitable through-connections, in order to also provide the electrical connection regions on the side of the contact plate 11 facing away from the connector housing 13.

Furthermore, the electrically conductive connector housing 13 of the connection device 1 is also electrically connected to the outer conductor of the coaxial cable. For this purpose, the electrical connection can, for example, be produced with a self-contained electrically conductive strand of adhesive 12. In this example, this self-contained strand of adhesive 12 comprehensively connects the connector housing 13 to the further contact sleeve 14 and consequently to the outer conductor of the coaxial cable. In this way, a low-resistance and low-impedance electrical connection between the connector housing 13 and the further contact sleeve 14 is attained, and the shielding of the outer conductor of the coaxial cable is continued through the connector housing 13. Instead of a strand of adhesive, any suitable and electrically conductive sealing compound can also be used.

Furthermore, it is also possible to mechanically press the further contact sleeve 14 into the connector housing 13. In this case, the electrically conductive strand of adhesive 12 can be dispensed with. Pressing the further contact sleeve 14 into the connector housing 13 results in, on the one hand, a stable mechanical connection between the further contact sleeve 14 and the connector housing 13 and, on the other hand, also results in the attainment of a good electrical connection between the two elements.

An electrically conductive connection which is as good as possible is achieved between the further contact sleeve 14 and the connector housing 13, both by utilizing an electrically conductive strand of adhesive 12 and by pressing the further contact sleeve 14 into the connector housing 13. The electrical connection between these two elements 13, 14 is, in this case, preferably executed with as low an electrical impedance as possible and at low resistance. In particular, the electrical connection can be as comprehensive as possible. In this case, a Faraday cage is produced by means of an electrical connection which is as complete as possible along the entire circumference. This results in a very good shielding from electrical currents.

The connector housing 13 covers the contact plate 11 as completely as possible. In particular, the side of the contact plate 11 is completely covered by the connector housing 13 which points in the direction of the connection element 15. In addition, the connector housing 13 also encloses the lateral regions of the contact plate 11. Consequently, the contact plate 11 is completely surrounded by the connector housing 13 with the exception of the side pointing downwards. In this way, an electromagnetic shielding in the form of a Faraday cage can be achieved upwardly as well as to the side.

Figure 2:
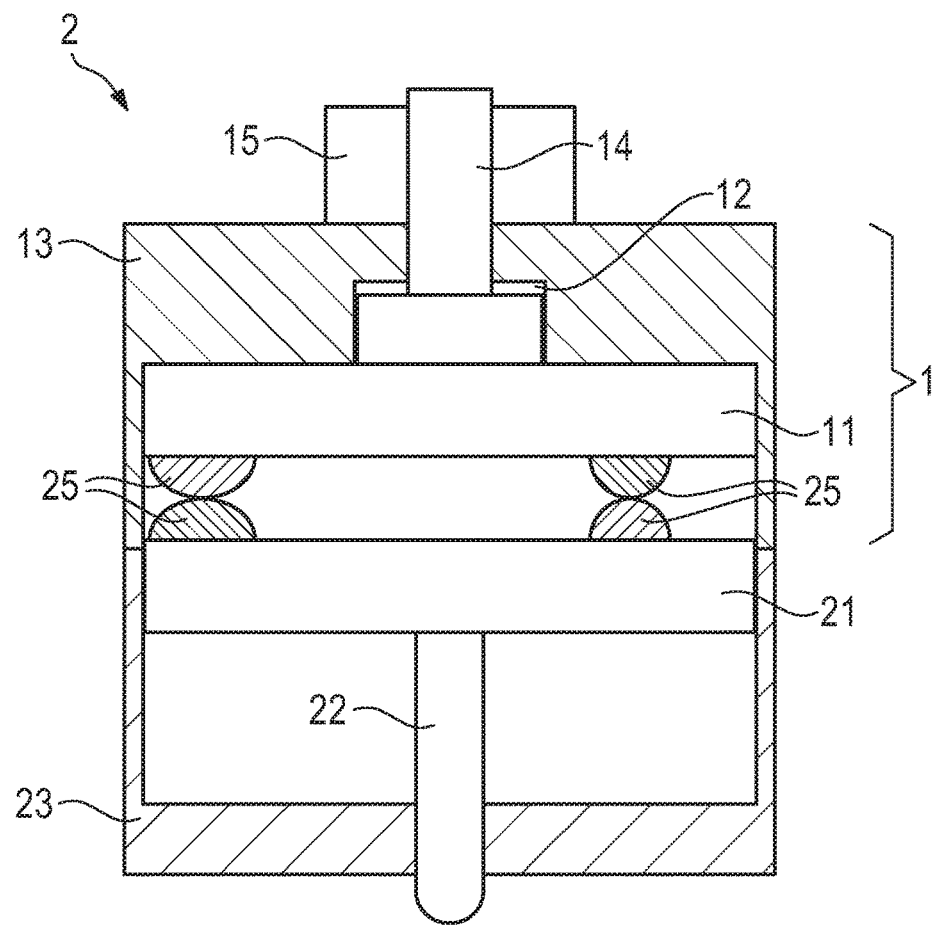
FIG. 2 shows a schematic representation of a cross-section through a camera module having a connection device for connecting a coaxial cable according to one embodiment.

FIG. 2 shows a schematic diagram of a cross-section through a camera module 2 according to one embodiment. The camera module 2 is, in this case, contacted by the previously described connection device 1 with a coaxial cable. The camera module 2 comprises, in this case, an image acquisition device with an optical module 22 and a printed circuit board 21. In this case, the electronics of the image acquisition device can be entirely or partially arranged on the printed circuit board 21. The printed circuit board 21 can, by way of example, be a printed circuit board as used for printed circuits. In particular, the printed circuit board 21 can, in this case, also include conductor path structures, at which an electrical connection with the inner conductor and the outer conductor of the coaxial cable is to be established. For this purpose, the printed circuit board 21 of the camera module 2 is arranged on the connection device 1 in such a manner that the corresponding regions of the conductor path structure point in the direction of the contact plate 11. The electrical connection between the first and the second connection region of the contact plate 11 and the corresponding connection regions on the printed circuit board 21 of the image acquisition device can, in this case, be produced, for example, by means of spring elements 25 or other suit-able electrical connection elements.

The image acquisition device with the optical module 22 and the printed circuit board 21 is, in this case, arranged in an electrically conductive camera housing 23. As can be seen from FIG. 2, the electrically conductive camera housing 23 shields, in this case, the optical module 22 and, if necessary, further components of the image acquisition device outwardly. Only the side of the printed circuit board 21 of the image acquisition device pointing in the direction of the connection device 1 is, in this case, not shielded by the electrically conductive camera housing 23. Of course, the camera housing 23 can additionally have an opening or a transparent window, via which light can fall on the optical module 22.

Joining the connection device 1 to the image acquisition device shielded by the camera housing 23 consequently creates a virtually completely closed space, which is formed by the electrically conductive connector housing 13 of the connection device 1 and the electrically conductive camera housing 23. In this case, the electrically conductive camera housing 23 can also be electrically connected to the connector housing 13. The camera housing 23 and the connector housing 13 can additionally be mechanically connected to one another. By way of example, such an electrical and/or mechanical connection of the connector housing 13 and the camera housing 23 can be produced by welding. By way of example, the connector housing 13 and the camera housing 23 can be connected to one another by means of laser welding. In addition, however, any other suitable methods for connecting the connector housing 13 and the camera housing 23 are also possible.

After the connector housing 13 and the camera housing 23 have been electrically and mechanically connected to one another, the interior space of the camera module 2 thus formed is shielded very well from electromagnetic interfering effects by the electrically conductive outer shell made up of the connector housing 13 and the camera housing 23. The rotationally symmetrical linking of the coaxial cable to such a camera module 2 allows, in this case, a virtually uninterrupted shielding of the sensitive components in the interior of the camera housing 23 or respectively connector housing 13.

Figure 3:
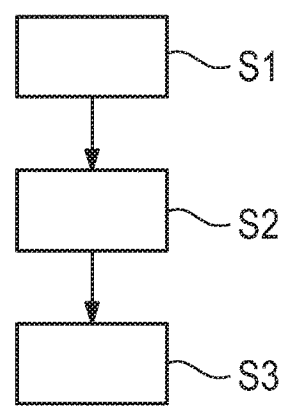
FIG. 3 shows a schematic representation of a flow chart, as it forms the basis of a method according to one embodiment.

FIG. 3 shows a schematic representation of a method for contacting a camera module 2, as it forms the basis of an embodiment.

First of all, a previously described connection device 1 is provided at S1. Furthermore, the connection regions of the contact plate 11 are contacted with corresponding contacts of the camera module 2, in particular with contact surfaces on the printed circuit board 21 of the image acquisition device, at S2. The connector housing 13 of the connection device 1 is subsequently connected, electrically and mechanically, to the camera housing 23 of the camera module 2, at S3.

In particular, the electrical and mechanical connecting can, in this case, comprise previously described welding such as, for example, laser welding.

In summary, the present disclosure relates to a connection of a camera module via a coaxial cable. To that end, the present disclosure creates a connection device for a coaxial cable which allows a comprehensive shielding by continuing the outer conductor through the entire housing of the connection device and onwards through the entire camera module. For this purpose, the outer conductor of an interface for the connection of a coaxial cable is electrically coupled with an electrically conductive housing, wherein the housing allows an electrical shielding of the inner components of a camera module.

The present disclosure has been described herein in an illustrative manner, and it is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

What is claimed is:

1. A connection device for connecting a coaxial cable to a camera module, comprising:
    an electrically conductive connector housing defining an opening;
    a connection element configured to connect an inner conductor of the coaxial cable to a first electrical connection of the connection element and an outer conductor of the coaxial cable to a second connection of the connection element, and wherein the connection element is disposed in the opening of the connector housing; and
    a contact plate having a first connection region electrically connected to the first connection of the connection element and a second connection region electrically connected to the second connection of the connection element, wherein the second connection of the connection element includes a further contact sleeve via which an entire circumference of the outer conductor of the coaxial cable may be connected, wherein the further contact sleeve is electrically connected to the electrically conductive connector housing using an electrically conductive adhesive such that a low-impedance electrical connection between the connector housing and the further contact sleeve is attained, and wherein the connector housing encloses a side facing the opening of the connector housing and side regions of the contact plate and wherein the connector housing and the second connection are comprehensively electrically connected to one another with a low impedance.

2. The connection device according to claim 1, wherein the connector housing and the second connection of the connection element are connected to one another with an electrically conductive adhesive.

3. The connection device according to claim 1, wherein the second connection of the connection element is comprehensively mechanically pressed into the connector housing.

4. The connection device according to claim 1, wherein the connection element comprises a FAKRA connector.

5. The connection device according to claim 1, wherein the connection element comprises a housing part which is adapted to the connection regions of the contact plate.

6. The connection device according to claim 1, further comprising a sealing element disposed on the side of the connector housing facing the coaxial cable.

7. The connection device according to claim 1, wherein the connector housing comprises at least one of a metal material and an electrically conductively coated plastic.

8. A camera module, comprising:
an image acquisition device having an optical module and a printed circuit board, wherein the optical module is arranged on a front side of the printed circuit board;
an electrically conductive camera housing, in which the image acquisition device is disposed; and
a connection device comprising
an electrically conductive connector housing defining an opening,
a connection element configured to connect an inner conductor of a coaxial cable to a first electrical connection of the connection element and an outer conductor of the coaxial cable to a second connection of the connection element, and wherein the connection element is disposed in the opening of the connector housing, and
a contact plate having a first connection region electrically connected to the first connection of the connection element and a second connection region electrically connected to the second connection of the connection element,
wherein the second connection of the connection element includes a further contact sleeve via which an entire circumference of the outer conductor of the coaxial cable may be connected,
wherein the further contact sleeve is electrically connected to the electrically conductive connector housing using an electrically conductive adhesive such that a low-impedance electrical connection between the connector housing and the further contact sleeve is attained, and
wherein the connector housing encloses a side facing the opening of the connector housing and side regions of the contact plate and wherein the connector housing and the second connection are comprehensively electrically connected to one another with a low impedance,
wherein the first connection region and the second connection region of the contact plate are each electrically coupled with an electrical connection on the printed circuit board of the image acquisition device.

9. The camera module according to claim 8, wherein the camera housing and the connector housing are electrically connected to one another.

10. The camera module according to claim 8, wherein the camera housing and the connector housing are welded to one another.

11. A camera module according to claim 8, further comprising a spring element electrically coupling the printed circuit board of the image acquisition device with the contact plate.

* * * * *